United States Patent [19]

Martin

[11] Patent Number: 5,025,351
[45] Date of Patent: Jun. 18, 1991

[54] ILLUMINATED SPLASH GUARD

[76] Inventor: Greg L. Martin, 2125 Glouchester Ave., Columbus, Ohio 43229-1514

[21] Appl. No.: 493,633

[22] Filed: Mar. 15, 1990

[51] Int. Cl.$^5$ .............................................. B60Q 1/00
[52] U.S. Cl. ..................................... 362/83; 362/800; 362/234; 362/83.3; 280/851; 40/551
[58] Field of Search ................ 362/61, 80, 800, 83.1, 362/253, 234, 252, 83.2, 83.3; 40/547, 550, 551; 280/851

[56] References Cited

U.S. PATENT DOCUMENTS

| | | | |
|---|---|---|---|
| 2,758,401 | 4/1956 | Wilson | 280/851 |
| 4,413,839 | 11/1983 | McCain | 362/80 |
| 4,607,444 | 8/1986 | Foster | 40/550 |
| 4,808,968 | 2/1989 | Caine | 362/61 |
| 4,854,062 | 8/1989 | Bazo | 40/551 |
| 4,860,475 | 8/1989 | Levy et al. | 40/547 |
| 4,879,826 | 11/1989 | Wittke | 40/551 |

Primary Examiner—Stephen F. Husar
Assistant Examiner—D. M. Cox
Attorney, Agent, or Firm—Leon Gilden

[57] ABSTRACT

An illuminated splash guard includes a matrix of light emitting diodes (LED) arranged in a preconfigured matrix to direct a desired signal rearwardly of the splash guard organization. The light emitting diodes are arranged within the direct current circuit of an associated vehicle and may optionally be of a plug-in arrangement or in a modified aspect of the invention, include a snap-on illumination member containing a series of the light emitting diodes throughout, wherein the member is in turn mechanically associated with the direct current circuit of the vehicle. A further modification of the invention includes a translucent illumination member secured to the flexible mud flap member, wherein the translucent member includes a fiber optic cable including a series of spaced light emitting diode members arranged at terminal and juncture portions of the translucent member to effect illumination thereof.

3 Claims, 4 Drawing Sheets

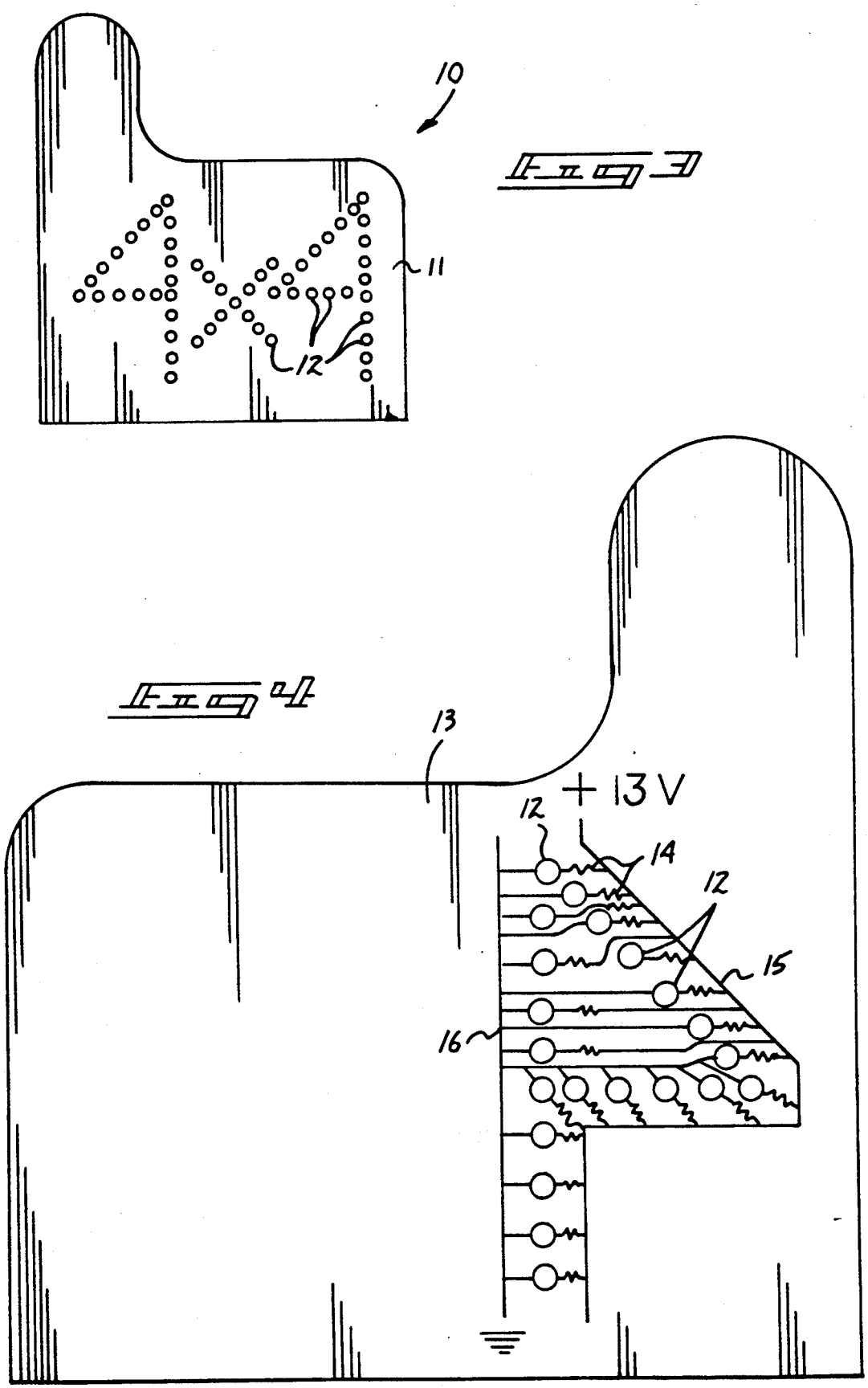

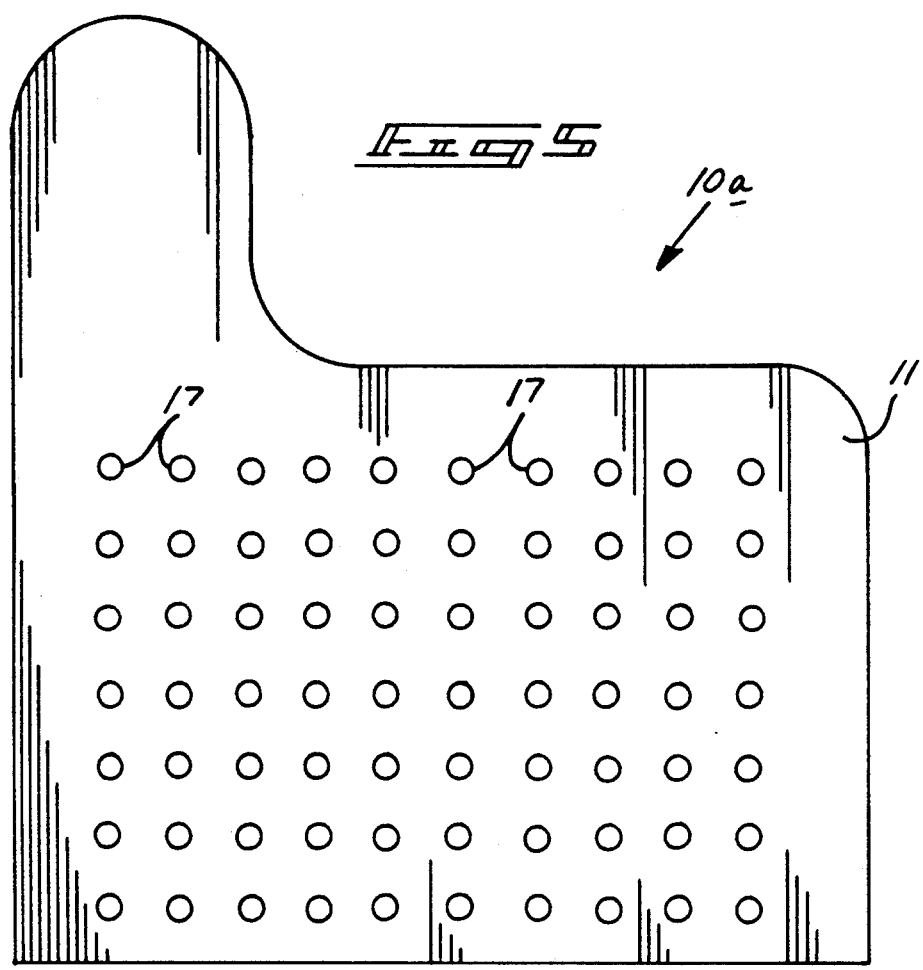
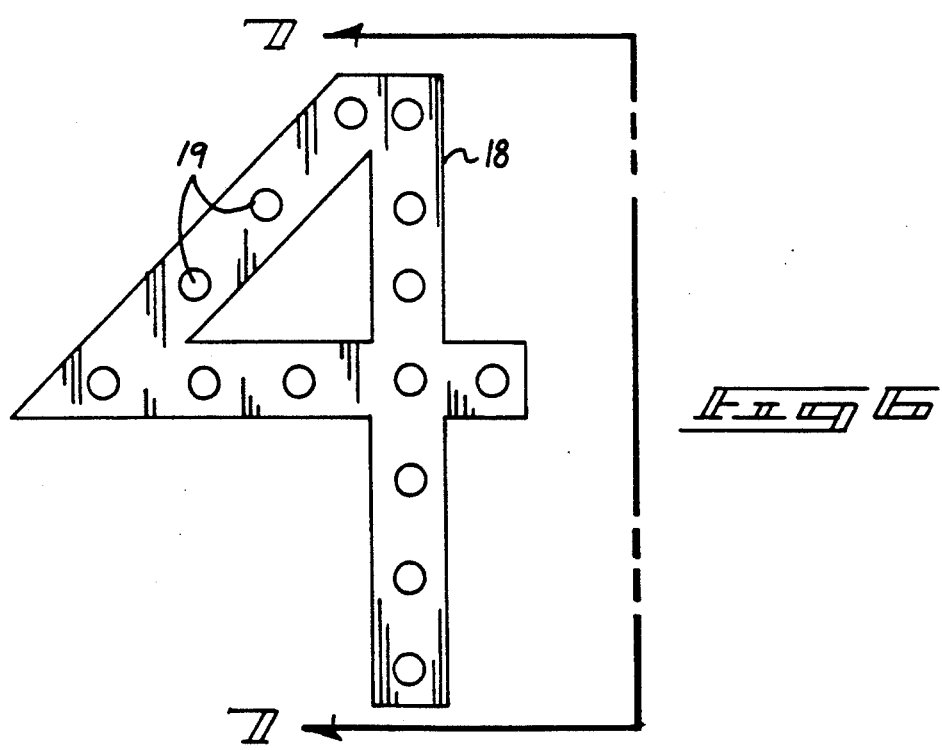

ILLUMINATED SPLASH GUARD

BACKGROUND OF THE INVENTION

1. Field of the Invention

The field of invention relates to vehicular accessory structure, and more particularly pertains to a new and improved illuminated splash guard wherein a predetermined and desired message is mounted on a forward face of a flexible splash guard to direct the message rearwardly thereof.

2. Description of the Prior Art

Various vehicular structures in association with splash guards are known in the prior art, and the use of light emitting diodes have been utilized in arrangements to effect directing of a message. Examples of the prior art include U.S. Pat. No. 4,713,586 to Chiang including a decorative matrix of light bulbs with an electric circuit including a plurality of oscillators producing pulses, with a comparator for comparing pulses of the two oscillators and a decoder actuated by the comparator, wherein random output signals are directed by the decoding means for lighting the bulbs randomly as if the light set were twinkling randomly.

U.S. Pat. No. 2,689,948 to Rothman sets forth a license plate holder including a framework mounting a series of lights thereon.

U.S. Pat. No. 4,821,158 to Mitten provides a rectangular frame wherein the bulbs are pressed into the framework and are retained within the framework by a groove arrangement to electrically associate the bulbs with an electrical circuit within the frame.

U.S. Pat. No. 4,128,860 to Spiteri provides a marker light assembly for use by tractor-trailers and the like, wherein by use of the diode circuitry utilized in the lights include an increased light factor in their use.

As such, it may be appreciated that there continues to be a need for a new and improved illuminated splash guard wherein the same addresses both the problems of ease of use, as well as effectiveness in construction in permitting the use of a matrix of lights on a flexible splash guard for use with vehicles and in this respect, the present invention substantially fulfills this need.

SUMMARY OF THE INVENTION

In view of the foregoing disadvantages inherent in the known types of illumination members now present in the prior art, the present invention provides an illuminated splash guard wherein the same permits securement of a matrix of illumination bulbs on the splash guard for directing a message rearwardly thereof. As such, the general purpose of the present invention, which will be described subsequently in greater detail, is to provide a new and improved illuminated splash guard which has all the advantages of the prior art illuminated members and none of the disadvantages.

To attain this, the present invention provides an illuminated splash guard including a matrix of light emitting diodes (LED) arranged in a preconfigured matrix to direct a desired signal rearwardly of the splash guard organization. The light emitting diodes are arranged within the direct current circuit of an associated vehicle and may optionally be of a plug-in arrangement or in a modified aspect of the invention, include a snap-on illumination member containing a series of the light emitting diodes throughout, wherein the member is in turn mechanically associated with the direct current circuit of the vehicle. A further modification of the invention includes a translucent illumination member secured to the flexible mud flap member, wherein the translucent member includes a fiber optic cable including a series of spaced light emitting diode members arranged at terminal and juncture portions of the translucent member to effect illumination thereof.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminated splash guard which has all the advantages of the prior art illumination members and none of the disadvantages.

It is another object of the present invention to provide a new and improved illuminated splash guard which may be easily and efficiently manufactured and marketed.

It is a further object of the present invention to provide a new and improved illuminated splash guard which is of a durable and reliable construction.

An even further object of the present invention is to provide a new and improved illuminated splash guard which is susceptible of a low cost of manufacture with regard to both materials and labor, and which accordingly is then susceptible of low prices of sale to the consuming public, thereby making such illuminated splash guards economically available to the buying public.

Still yet another object of the present invention is to provide a new and improved illuminated splash guard which provides in the apparatuses and methods of the prior art some of the advantages thereof, while simultaneously overcoming some of the disadvantages normally associated therewith.

Still another object of the present invention is to provide a new and improved illuminated splash guard wherein the same is readily mounted in association with an automotive direct current circuit to permit directing of a message rearwardly of the splash guard.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic frontal view taken in elevation of a splash guard of the instant invention.

FIG. 4 is a rear orthographic view, partially in section, illustrating diagrammatically the matrix of lights mounted therewithin.

FIG. 5 is an orthographic frontal view of a modification of the instant invention illustrating a matrix of apertures for receiving press-in lights therewithin.

FIG. 6 is an orthographic frontal view taken in elevation of a snap-in illumination member utilized by the instant invention.

DESCRIPTION OF THE PREFERRED EMBODIMENT

Figure 1:
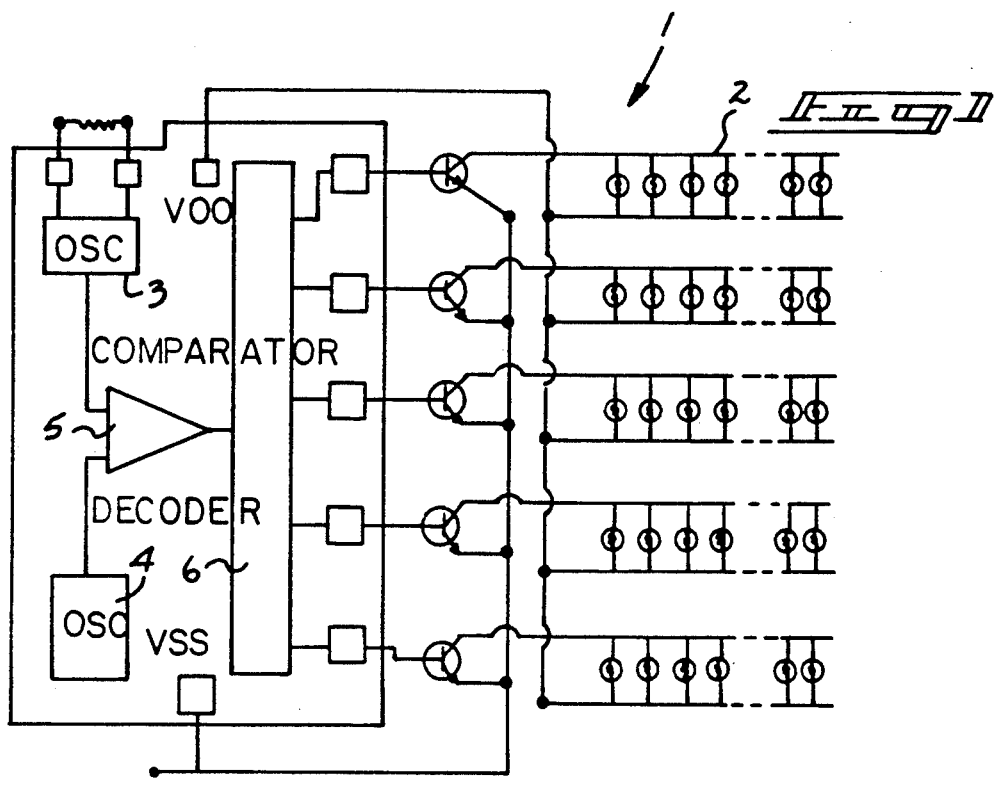
FIG. 1 is a diagrammatic illustration of a prior art light matrix organization.

With reference now to the drawings, and in particular to FIGS. 1 to 8 thereof, a new and improved illuminated splash guard embodying the principles and concepts of the present invention and generally designated by the reference numerals 10 and 10a will be described.

Figure 2:
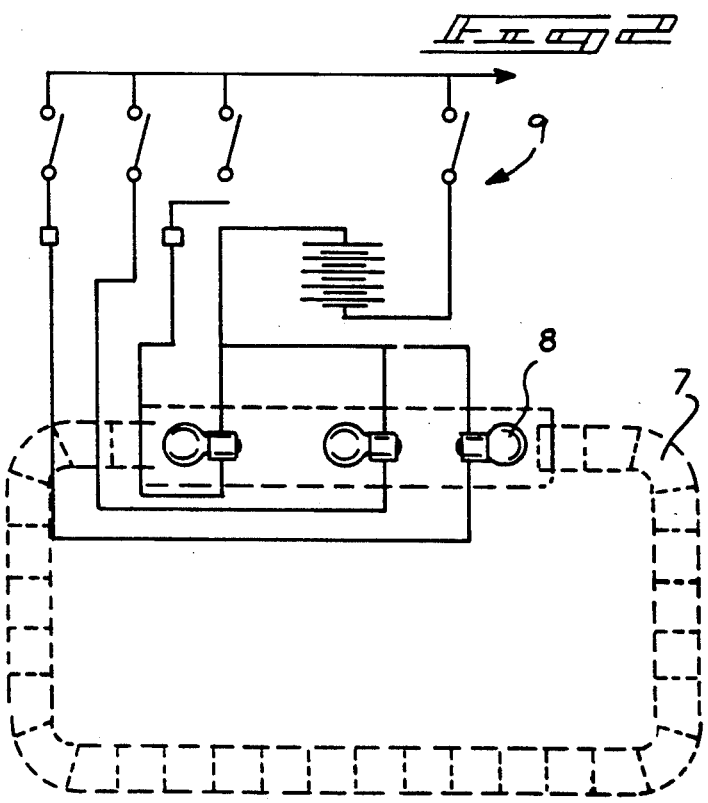
FIG. 2 is a diagrammatic illustration of a further prior art illumination structure directing illumination of a framework of lights.
Figure 7:
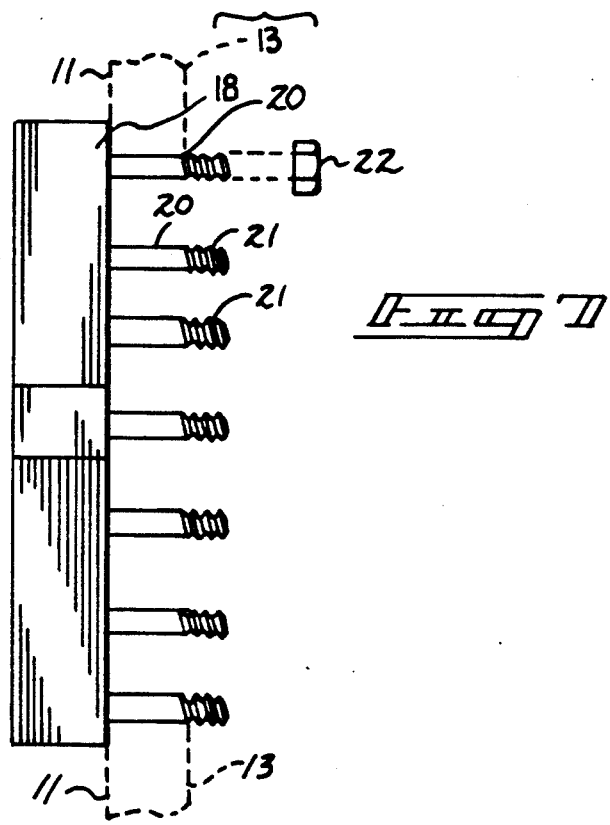
FIG. 7 is an orthographic side view taken along the lines 7—7 of FIG. 6 of the snap-in illumination member of FIG. 6.

FIG. 1 illustrates a prior art illumination organization 1 wherein a matrix of lights 2 includes a first and second oscillator directed through a comparator 5 which in turn is directed into a decoder to randomly illuminate a matrix of lights 2. FIG. 2 includes an illumination member wherein a framework of lights 7 utilizing bulbs 8 are operative through a switching circuit 9 to effect illumination of the framework of lights.

More specifically, the illuminated splash guard 10 of the instant invention essentially comprises a flexible polymeric mud flap member including a forward surface 11 and a rear surface 13, with a matrix of light emitting diodes 12, or illumination sources, arranged in a predetermined array to effect a message through the use of the configuration of the matrix of the LED bulbs. FIG. 4 illustrates the LED bulbs 12 cooperative through associated resistors 14. The resistors are typically of a 2.2K resistance for use with the apparatus cooperative with a conventional motor vehicle direct current electrical circuit that includes a negative electrical transmission wire 16 spaced from a positive electrical transmission wire 15 to complete circuitry of the associated LED members 12 therebetween.

FIG. 5 illustrates a modified splash arrangement 10a including a rectangular matrix of LED receiving apertures 17 to receive snap-in illumination LED members therewithin cooperative with the positive and negative electrical transmission lines 15 and 16 respectively. Conversely, a snap-in illumination member 18 is secured within the apertures 17. The illumination member 18 includes a matrix of LED light members 19 mounted thereon coextensive with the configuration of the illumination member. The illumination member 18 further includes a series of orthogonally mounted studs 20 including threaded forward ends 21, wherein positioning of the studs 18 through selective apertures 17, electrical contact is effected to create illumination of the LED members 19. Threaded fasteners 22 are securable to the threaded lower ends 21 of the studs 20 to capture the flexible mud flap member therewithin, as illustrated in phantom in FIG. 7.

Figure 8:
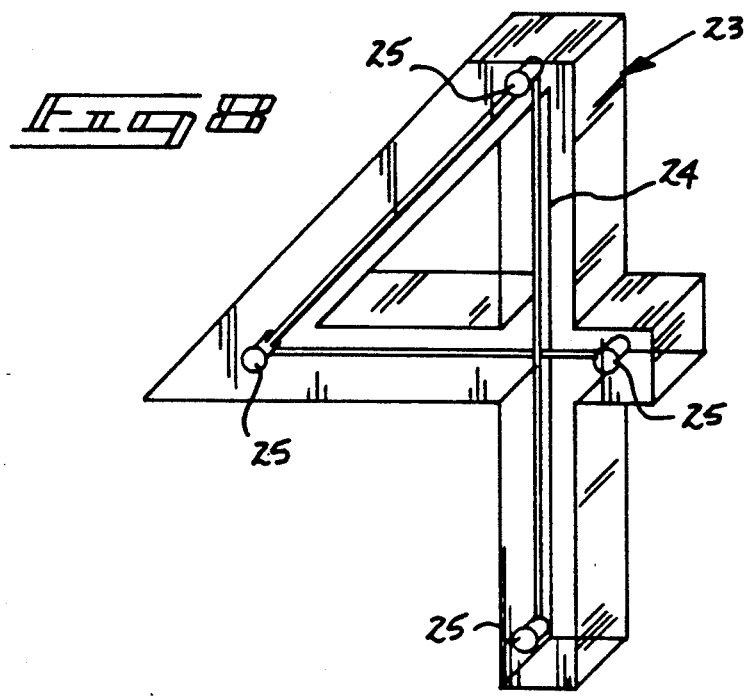
FIG. 8 is an isometric illustration of a modified snap-in member formed of translucent material.

FIG. 8 illustrates the use of an alternative illumination member defined as a translucent geometric illumination member 23, including the threaded studs 20 and threaded lower ends 21, but wherein the illumination member in addition to being translucent includes a fiber optic cable 24 directed medially throughout the member 23. Light emitting diodes 25 are arranged and fixedly mounted within the translucent member at terminal ends of the fiber optic cable 24 and at an angular connecting joints of the fiber optic cable mounted within the translucent member 23.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illumination member comprising, in combination,
    a flexible splash guard including a forward surface spaced from a rear surface, and
    the forward surface including a matrix of light emitting diodes mounted thereon for creating a message on the forward surface, and
    a negative transmission line, and a positive transmission line directed interiorly of the splash guard between the forward surface and the rear surface to effect illumination of the light emitting diodes, and wherein a rectangular matrix of apertures are directed through the forward and the rear surface of the splash guard in electrical communication with the electrical transmission lines, and a snap-on illumination member selectively mounted in selective ones of the matrix of apertures for securement of the illumination member thereon, and for electrical communication therewith and the illumination member including the light emitting diodes mounted thereon.

2. A splash guard as set forth in claim 1 wherein the illumination member includes a series of studs, the studs in electrical communication with the positive and negative transmission lines when mounted through the forward and rear surfaces of the splash guard, the studs orthogonally mounted to a rear surface of the illumination member and including a threaded free end, and a threaded securement member threadedly received on a threaded free end to capture the splash guard between the rear surface of the illumination member and the threaded fastener member secured to each threaded end.

3. A splash guard as set forth in claim 2 wherein the illumination member is formed of a translucent solid material, the translucent member including a fiber optic cable directed therethrough, and the light emitting diodes mounted at each terminal end of the fiber optic cable and at angular connecting joints of the fiber optic cable within the illumination member to effect illumination of the translucent illumination member.

* * * * *